(12) United States Patent
Chen et al.

(10) Patent No.: US 9,704,403 B2
(45) Date of Patent: Jul. 11, 2017

(54) SYSTEM AND METHOD FOR COLLISION AVOIDANCE FOR VEHICLE

(71) Applicant: INSTITUTE FOR INFORMATION INDUSTRY, Taipei (TW)

(72) Inventors: Shing-Yu Chen, New Taipei (TW); Jui-Yang Tsai, New Taipei (TW); Chien Lee, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 14/957,955

(22) Filed: Dec. 3, 2015

(65) Prior Publication Data
US 2017/0162050 A1    Jun. 8, 2017

(51) Int. Cl.
| G06G 7/70 | (2006.01) |
| --- | --- |
| G08G 1/16 | (2006.01) |
| G05D 1/00 | (2006.01) |
| B60W 30/09 | (2012.01) |

(52) U.S. Cl.
CPC ............ *G08G 1/162* (2013.01); *B60W 30/09* (2013.01); *G05D 1/0055* (2013.01); *B60W 2550/308* (2013.01); *B60W 2550/402* (2013.01)

(58) Field of Classification Search
CPC ............ G08G 1/16; G05D 1/00; B60W 30/09
USPC ........................................ 701/117, 23–25, 36
See application file for complete search history.

(56) References Cited

U.S. PATENT DOCUMENTS

| 2008/0215232 | A1* | 9/2008 | Ikeda ................. | G08G 1/09675 701/117 |
| --- | --- | --- | --- | --- |
| 2015/0166059 | A1* | 6/2015 | Ko ........................ | B60W 30/09 701/28 |
| 2015/0266473 | A1* | 9/2015 | Hayasaka .............. | B60W 30/09 701/70 |
| 2016/0035220 | A1* | 2/2016 | Paromtchik .......... | G08G 1/0137 701/117 |

* cited by examiner

*Primary Examiner* — Thomas G Black
*Assistant Examiner* — Luke Huynh
(74) *Attorney, Agent, or Firm* — Li & Cai Intellectual Property (USA) Office

(57) ABSTRACT

The disclosure is related to a system and a method for collision avoidance for vehicle. In the method, the system predicts multiple routes of an abnormal vehicle in a period of time according to historical data when a nearby vehicle receives an alert from the abnormal vehicle. A route potential pattern can be created when the system gets the historical data. The system also computes one or more available routes for the nearby vehicle based on its vehicle information. Every available route has its collision risk value. The system finally provides a recommended route with lower collision risk value when it considers a time of the abnormal vehicle reaches its great change, a time of predicting the nearby vehicle meets the range of route potential pattern, and a safe distance there-between.

16 Claims, 9 Drawing Sheets

SYSTEM AND METHOD FOR COLLISION AVOIDANCE FOR VEHICLE

BACKGROUND

1. Technical Field

The present invention is related to a system and a method of vehicle safety; in particular, to a system and a method of avoiding the collision with the abnormal vehicle as receiving the alerting message sent by the abnormal vehicle.

2. Description of Related Art

A driver should focus on driving a car when he is in a driving progress on a road. The driver generally should watch if the nearby vehicle is in abnormal condition. Then the driver can avoid any accident once he finds out the nearby vehicle is in trouble. Further, the any accident may be effectively avoided if the driver can recognize the nearby vehicles' abnormal conditions in advance.

To avoid any accident on the road, the conventional technology has been provided to transmit the malfunction message to its near vehicles for reference. According to the technology, the nearby vehicle can estimate the abnormal vehicle's route when the nearby vehicle receives the malfunction message. However, the conventional technology still fails to make accurate and advanced estimation because it only provides rough information as lacking of more driving information such as the driver's behavior of gas pedal, brake and steering wheel. Therefore, the driver may make mistake when he has no enough time to determine the right way to avoid the abnormal vehicle.

SUMMARY

The present invention is directed to a system and a method relating to driving safety. The system introduces the historical data relating to the abnormal signal generated by an abnormal vehicle to predict the traveling route for the abnormal vehicle in a future period of time. Further, the vehicle information of the nearby vehicle is also incorporated to the system for assessing its available route. While the system determines the available routes, it also computes collision risk values for the routes according to vehicle information from the nearby vehicle. The system then provides the available route with lower collision risk value as the recommended route for the nearby vehicle to avoid the abnormal vehicle, including issuing warning messages at the moment.

In the embodiment of the method of collision avoidance for vehicle disclosed in the disclosure, an abnormal vehicle under an abnormal condition and a nearby first vehicle are defined. When the abnormal vehicle generates the abnormal signal, an avoidance system inside the first vehicle acquires the historical data corresponding to the abnormal signal of the abnormal vehicle, and also the vehicle information including at least one of operating statuses of gas pedal, brake, and steering wheel. Based on these data, the avoidance system can predict the traveling route in a future time. In the meantime, the avoidance system also receives the vehicle information of the first vehicle, one or more available routes for the first vehicle can be determined. The system then computes collision risk value for every available for the first vehicle. The information of the available routes' collision risk values allows arranging the routes for avoiding the abnormal vehicle.

In one embodiment, the historical data used to predict the traveling route for the abnormal vehicle is recorded in a database. The database has recorded the data relating to the abnormal signal and corresponding vehicle information. The data in the database has been categorized based on similarity. The data relating to the vehicle information includes at least one of an abnormal code, a collision, an event time, a vehicle location, a vehicle speed, vehicle acceleration, a vehicle direction, and climate corresponding to the abnormal signal.

In one further embodiment, the avoidance system computes the collision risk value for every recommended route based on whether or not the recommended route enters a route potential pattern of the abnormal vehicle.

When the avoidance system provides the recommended route, the system determines if a distance between the first vehicle and the abnormal vehicle is smaller than a safety distance. If the distance is smaller than the safety distance, the system provides an instant best recommended route to the first vehicle; otherwise, the system re-computes the collision risk value for every recommended route in every time interval if the distance between the first vehicle and the abnormal vehicle is larger than the safety distance. It is noted that every time interval corresponds to an instant best recommended route. The computation is periodically performed until the system finds out a collision risk value lower than a risk threshold. The available route corresponding to the instant collision risk value is set as the best recommended route. The instant collision risk value may meet the best collision risk value. Further, when the avoidance system re-computes the collision risk value, an instant available route may be set as the best recommended route if the abnormal vehicle becomes abnormal.

In another embodiment, the avoidance system may compare a distance as the abnormal vehicle becomes abnormal from the normal state and another distance as the nearby vehicle enters the route potential pattern of the abnormal vehicle, whichever is smaller, with the safety distance, in view of the risk threshold, so as to obtain the route with the lower collision risk value.

The disclosure is also directed to a system used to implement the method for collision avoidance for vehicle.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

Figure 1:
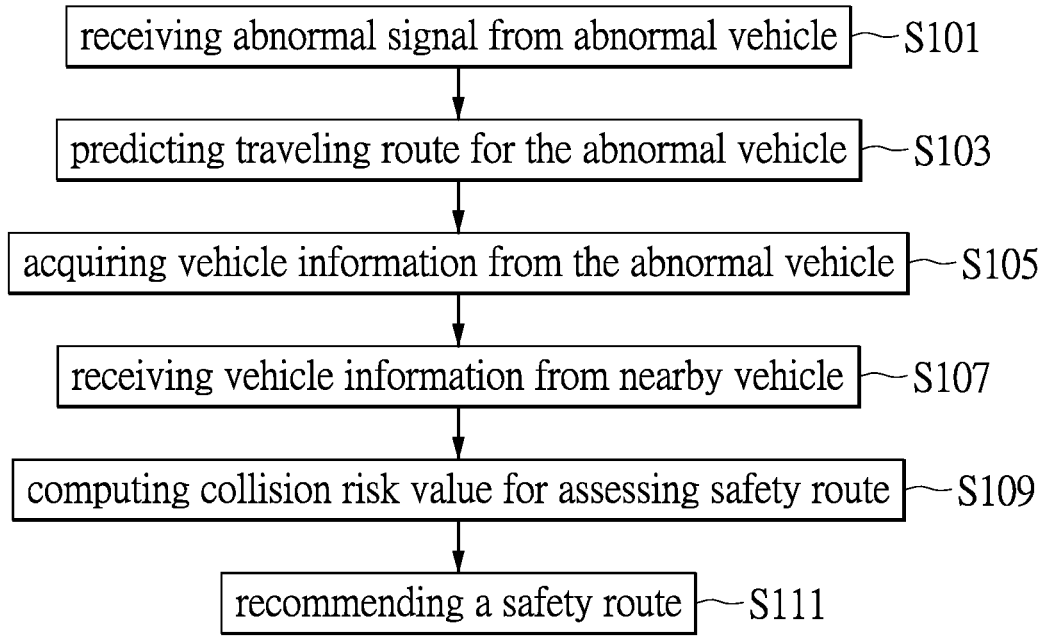
FIG. 1 shows a flow chart describing the method of collision avoidance for vehicle in one embodiment of the present invention.

Reference will now be made in detail to the exemplary embodiments of the present disclosure, examples of which are illustrated in the accompanying drawings. Wherever possible, the same reference numbers are used in the drawings and the description to refer to the same or like parts.

The disclosure in accordance with the present invention is related to a method for collision avoidance for vehicle, and a system for implementing the method. For embodying the method, the avoidance system in the vehicle can receive an alert from an abnormal vehicle when the abnormal vehicle is in trouble. In the method, before the vehicle meets the trouble, an avoidance system installed in the vehicle is provided to acquire an early warning generated by the abnormal vehicle, and to predict its traveling route according to the vehicle's conditions. The system also suggests the available route for the nearby moving vehicle to effectively avoid the abnormal vehicle. The system is essentially applied to the issue of safe driving.

Figure 7:
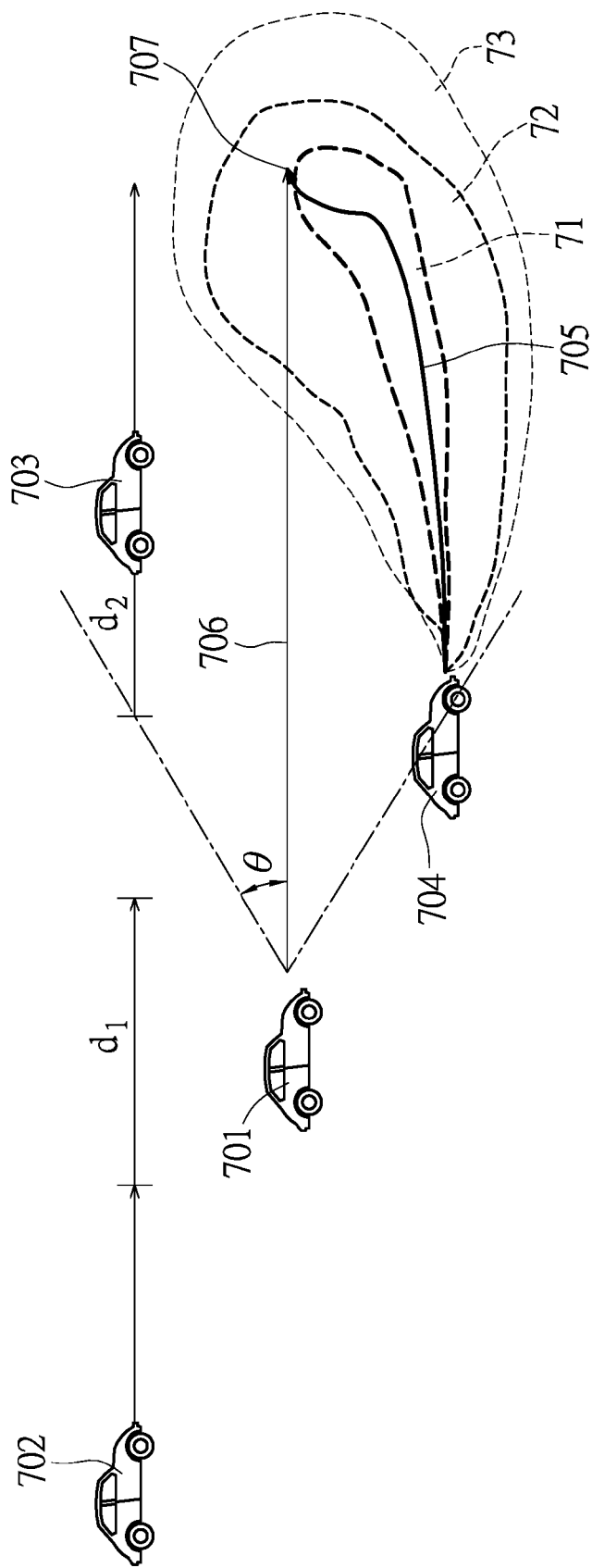
FIG. 7 shows a schematic diagram depicting avoidance for the nearby vehicle in the method in one embodiment of the present invention.
Figure 10:
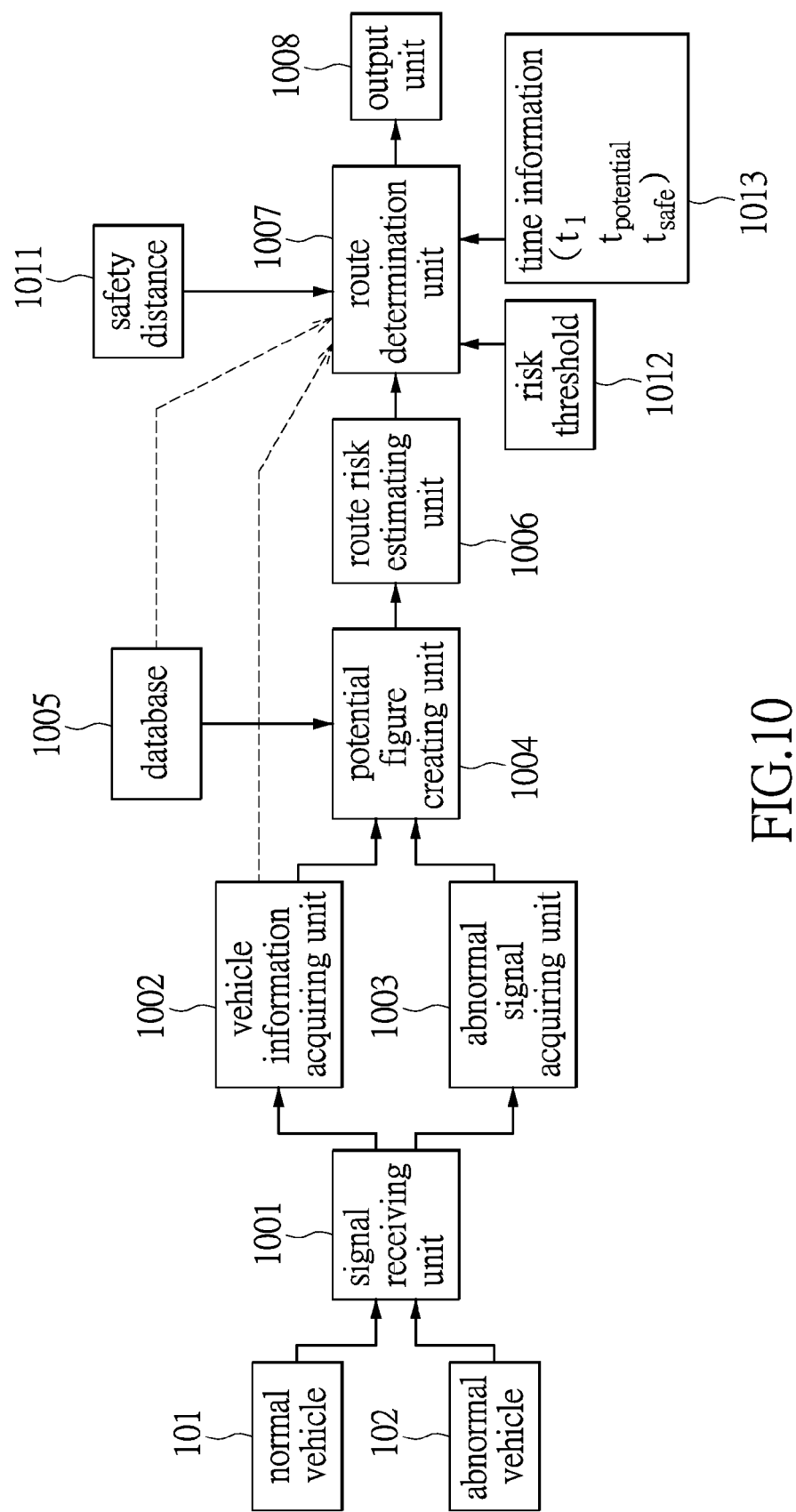
FIG. 10 shows a block diagram of the system according to the embodiment of the present invention.

According to the system in one embodiment disclosed in the disclosure, referring to the example described in FIG. 7, the vehicles including a first vehicle 701, a second vehicle 702, a third vehicle 703, and a fourth vehicle 704 on the road may respectively have a communication circuit to communicate with each other, and a circuit to get the vehicle information from other vehicles. FIG. 10 schematically shows the block diagram describing the circuits. The vehicle information is such as the abnormal signal, especially the trouble messages regarding the factors affecting the driving safety.

According to one embodiment of the present invention, an avoidance system is incorporated in the abnormal vehicle. The avoidance system is able to receive the abnormal signal generated by the abnormal vehicle itself. The avoidance system predicts the traveling route for the abnormal vehicle according its historical data. The system also provides recommended route for the abnormal vehicle based on a risk assessment and consideration of other vehicles' vehicle information.

In the exemplary example described in FIG. 7, when the vehicle shown as the fourth vehicle 704 meets malfunction, a trouble code is generated and sent to the nearby vehicle such as the first vehicle 701. The trouble code is such as DTC (Diagnostic Trouble Codes). The avoidance system in the nearby vehicle then predicts the traveling route of the abnormal vehicle according to the historical data, and computes collision risk for avoiding the abnormal vehicle. Further, the system may also consider the driving routes of more nearby vehicles such as the second vehicle 702 and the third vehicle 703 shown in FIG. 7. The system retrieves the signals such as the operations of gas pedal, brake, and steering wheel, and accordingly determines the recommended route for avoiding the abnormal vehicle and/or the nearby vehicle(s).

In the method for collision avoidance, referring to the flow chart shown in FIG. 1, the vehicles should stay in communication state. In the communication state, the vehicles can receive the vehicle information including the abnormal signal from each other within a certain distance. The communication may be implemented by incorporating WiFi™, Bluetooth™, or Beacon which embodies an intelligent positioning technology. When the avoidance system installed in a vehicle, e.g. the first vehicle, receives the abnormal signal generated by the abnormal vehicle, such as in step S101, an abnormal event is confirmed. In view of the historical data corresponding to the abnormal signal, the system analyzes the data and renders a predicted traveling route within a future period of time, such as in step S103.

In the meantime, the avoidance system receives the vehicle information including at least one of the operating statuses of gas pedal, brake, and steering wheel of the abnormal vehicle, such as in step S105. The avoidance system also receives the vehicle information from a vehicular computer of other nearby vehicle such as the first vehicle itself and/or others. For example, the vehicle information can be retrieved from a port in compliance with OBD (On-board diagnostics)/OBD II. The system therefore determines one or more predicted traveling routes as acknowledging the acceleration and the steering angle of the first vehicle with the period of time, in view of the first vehicle's operating capability and at least one of the operating statuses of gas pedal, brake, and steering wheel (step S107).

The avoidance system is installed in the first vehicle, and is used to predict the traveling route of the abnormal vehicle near the first vehicle based on the abnormal signal. The avoidance system also computes the collision risk value for every route as considering the traveling route of the first vehicle, so as to assess the safety route, such as in step S109. The avoidance system then suggests one safety route for the driver of the first vehicle according to the collision risk value computed for every available route, such as step S111, and informs the recommendation to the first vehicle.

Figure 2:
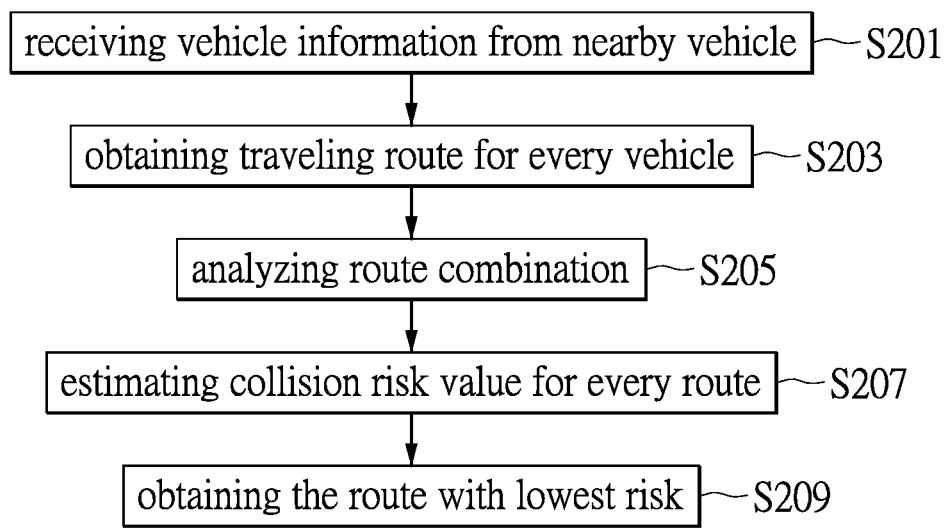
FIG. 2 shows another flow chart describing the method of collision avoidance for vehicle in another one embodiment of the present invention.

In the method, in addition to considering both the traveling routes of the abnormal vehicle and the first vehicle, the system further considers the driving conditions of other nearby vehicles for providing more rigorous recommended routes. Reference is made to FIG. 2.

According to the embodiment shown in FIG. 2, the system predicts the safety route according to the condition of the abnormal vehicle, in addition the system also receives the vehicle information from other nearby vehicle such as the second vehicle. The system retrieves the information relating to the gas pedal, brake and steering wheel from the vehicle information of the second vehicle. It is noted that the information of brake is related to the data of speed and acceleration, and the steering wheel is related to data of steering. The vehicle information of the second vehicle is adapted to retrieve the traveling route at the same time. After that, the system re-computes the collision risk value for the available route(s) for abnormal vehicle based on the traveling routes respectively for the first vehicle, the second vehicle, and the abnormal vehicle.

The flow chart shown in FIG. 2 describes method according to one of the embodiments in accordance with the present invention. In particular, the method is able to have the safety route with the lowest risk from the multiple routes.

In the beginning, such as in step S201, the avoidance system installed in the first vehicle receives vehicle information from itself and/or the other nearby vehicle(s). The vehicle information is such as the operating statuses of gas pedal, brake, and/or steering wheel. Therefore, the system can obtain the information relating to the vehicle's speed, acceleration, and steering. When the nearby vehicle is abnormal, the other nearby vehicles may acquire the abnormal signal from this abnormal vehicle, and determine the abnormal item.

To the abnormal vehicle, the avoidance system continuously predicts the predicted route in future period of time according to the historical data and the vehicle information until the abnormal vehicle suffers the great change. To the normal vehicle, the system can also determine its traveling route according to its vehicle information, such as in step S203. Thus, the system integrates the predicted route for the abnormal vehicle and the traveling route of other nearby vehicle so as to find out the possible routes according to the nearby vehicle's speed, acceleration/deceleration, and steering angle. Therefore, multiple available routes for avoiding the collision with the abnormal vehicle can be generated, such as in step 205.

In the avoidance system, the collision risk value for every route can be estimated, such as in step S207. The route with the lowest collision risk value is preferably the best recommended route, such as in step S209. If it still has time to make determination, the avoidance system determines whether or not a distance between the first vehicle and the abnormal vehicle is larger than or equal to a predetermined safety distance, the avoidance system continuously computes the collision risk value for every available route for the first vehicle until any collision risk value for a route is lower than a system-defined risk threshold, or the abnormal vehicle starts the abnormal change.

In the determination, when the distance between the first vehicle and the abnormal vehicle is larger than or equal to the safety distance, the system continuously finds out the route with the lowest collision risk value, and sets the route as the best recommended route. Otherwise the avoidance system sets the instant route as the best recommended route once the avoidance system determines the distance between the first vehicle and the abnormal vehicle is smaller than the safety distance, or the abnormal vehicle starts change or meets the great change. It is worth noting that the historical data is provided in the system to predict the time and direction of the great change when the abnormal vehicle generates the abnormal signal.

In the method for computing the collision risk value for every recommended route, the vehicle information such as steering, speed, and/or acceleration from the nearby vehicle can be referred for determining the distance between the preceding and following vehicles, the probability of entering the route potential pattern of the abnormal vehicle. The parameters of the mentioned factors can be weighted in the computation. The system can find out the similar past data as checking the historical data. The collision risk value for every recommended route is computed using equation (1) in an exemplary example. The risk value R equal to:

$$R = \text{nor}(\theta) \times W_\theta + \text{nor}(a) \times W_a + \text{nor}(d_1) \times W_{d1} + \text{nor}(d_2) \times W_{d2} + \text{nor}(P) \times W_p \quad \text{equation (1)}$$

Wherein, 'R' means risk value; 'nor' is a function of normalization; '$\theta$' is a steering angle; '$W_\theta$' is a weight for the steering angle; 'a' is acceleration value; 'Wa' is a weight for the acceleration value; '$d_1$' is a distance from a following vehicle; '$W_{d1}$' is a weight for the distance from the following vehicle; '$d_2$' is another distance from a preceding vehicle; '$W_{d2}$' is a weight for the distance from the preceding vehicle; 'P' means the probability of entering the route potential pattern; and '$W_p$' is a weight for the probability of entering the route potential pattern.

Figure 3:
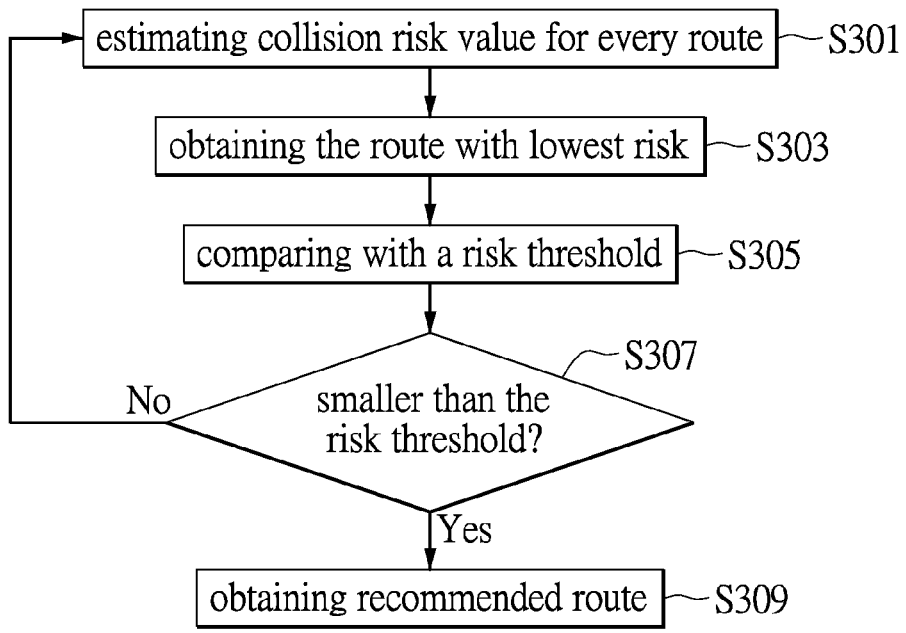
FIG. 3 shows a flow chart describing acquiring recommended route in the method according to one embodiment of the present invention.

FIG. 3 shows a flow chart describing determining the recommended route based on the risk threshold according to the embodiment of the present invention.

As the mentioned, the avoidance system can arrange multiple recommended routes for the vehicles from the predicted traveling routes according to the vehicle information of the first vehicle and/or the second vehicle, the historical data and vehicle information of the abnormal vehicle. In step S301, the collision risk value for every route can be estimated. Therefore, every recommended route has its own collision risk value.

In the next step S303, the avoidance system acquires the route with lowest collision risk value from the multiple recommended routes which have their corresponding collision risk values. This route with the lowest collision risk value is set as the best recommended route in the system. If there is enough time to make the determination, e.g. the distance between the vehicles is larger than a safety distance; some variant factors may be taken into account for the determination. It is noted that the factors can be taken in account are such as the distance between vehicles, speeds, acceleration, steering of the nearby vehicles, and/or whether or not the abnormal vehicle meets the great change. Therefore, the avoidance system may still generate the further recommended routes when the system continuously estimates the collision risk value for every recommended route.

Next, in step S305, the system compares the collision risk value for every route with a system-defined risk threshold so as to determine whether or not the collision risk value is smaller than the risk threshold, such as in step S307. When the collision risk value is larger than or equal to the risk threshold (no), the process goes to step S301 for continuously estimating the every collision risk value for gaining the route with lowest risk until gaining the collision risk value lower than the risk threshold. Otherwise when the system finds out route with the collision risk value lower than the risk threshold, the instant route corresponding to this collision risk value can be regarded as the best recommended route, such as in step S309. It is noted that the available route with the collision risk value lower than the system-defined risk threshold can still be the route with the lowest collision risk value.

In another aspect of the invention, when the system still has enough time to find out the route with the lowest collision risk value but not just the instant route with the collision risk value lower than the risk threshold, the system may repeat the foregoing steps S301, S303 and S305. During the period of time trying to find the route with the lowest collision risk value, the system may adopt the available route which had been estimated to have the currently-lowest risk currently because the abnormal vehicle is detected to suffer the abnormal condition that urges the nearby vehicle to take the requisite avoidance action. The mentioned available route with currently-lowest collision risk value is the route provided for the nearby vehicle to avoid the abnormal vehicle.

Figure 4:
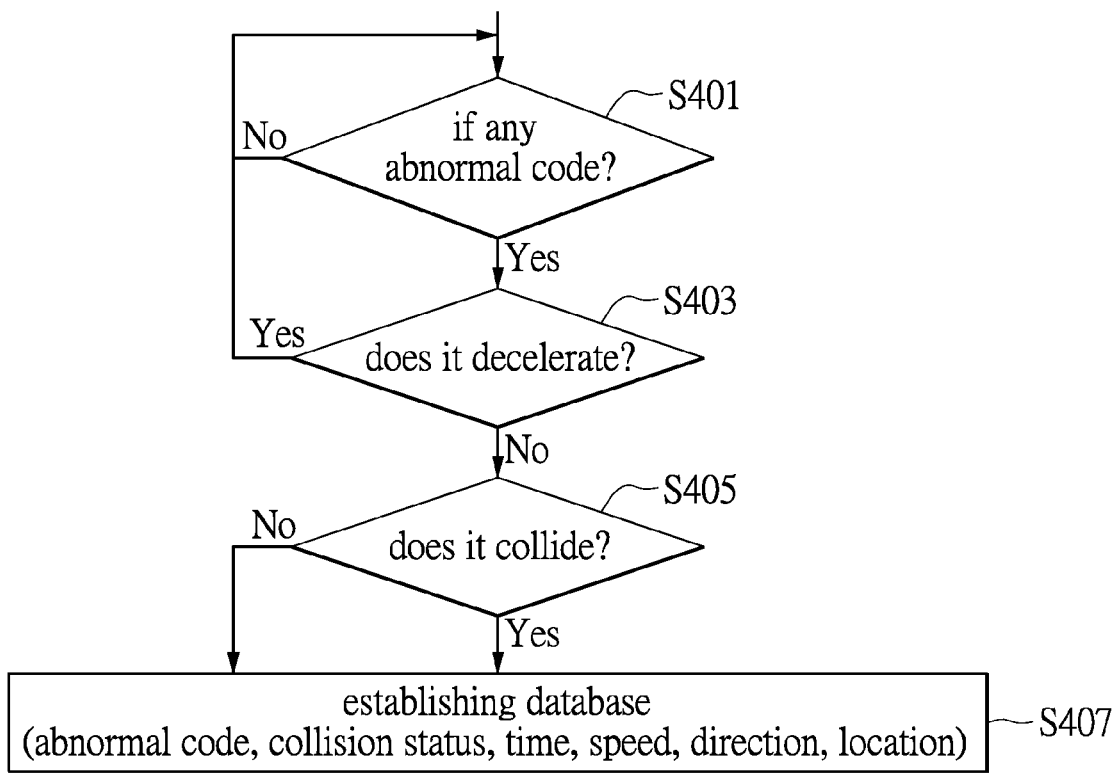
FIG. 4 shows a flow chart describing establishing the database used to predict traveling route of the abnormal vehicle in the method according to one embodiment of the present invention.

Reference is made to FIG. 4 depicting the exemplary procedure in the method for establishing the database provided to predict the traveling route for the abnormal vehicle.

The historical data provided for predicting the traveling route of the abnormal vehicle is recorded in a database. The database allows the system to predict the traveling route for the abnormal vehicle in future period of time. The database may be installed in a vehicle, a specific carrier, or in a cloud system. The records of the database are the historical data of driving records collected from the vehicles, including any situation as meeting the abnormal event. The records are such as the data relating to the speed, acceleration, and/or steering as operating the gas pedal, brake and/or steering wheel. The records also include the information of time and location. After accumulating the data for a period of time, some driving modes can be established, and allow the system to predict the traveling route of the vehicle which meets the similar situation. The driving modes may render the models for the further determination. In an exemplary example, the avoidance system from every nearby vehicle may acquire the data as linking to the local/remote database when the system detects the abnormal signal generated by the abnormal vehicle. If the system finds out the similar case from the database, it is able to predict the traveling route for the abnormal vehicle.

In the process to establish the database according to one embodiment of the present invention, in the beginning step S401, the system determines if any abnormal code or trouble code comes out from the signals received from the vehicles, e.g. the vehicular computer. The step S401 for detecting the abnormal code should be continued when the system finds no abnormal code from the collected signals.

When the system confirms it receives the abnormal signal, which may be expressed in form of abnormal code or trouble code, the system retrieves the data corresponding to the abnormal code and determines a driving mode. The system determines if the vehicle slows down due to the abnormal event when it continuously receives vehicle information from the abnormal vehicle, such as in step S403. It is noted that the exemplary example is not the limitation for the present invention.

In an exemplary example, when the system determines the abnormal vehicle slows down its speed ('yes') based on the information relating to the operating statuses of the gas pedal and brake, the system may ignore or does not respond the event because it affirms that the driver of the abnormal vehicle acknowledges and reacts to the abnormal event. The related data may be ignored and won't be in the records. The procedure then goes back to step S401 for further detection. Otherwise if the system determines that the abnormal vehicle does not slow down ('no') based on the vehicle information, it may show the abnormal vehicle will threaten the nearby vehicle(s) within a short time, such as in step S405, the system will assess if any collision occurs.

Next, when the system finds out a possibility of the other normal vehicle collides with the abnormal vehicle ('yes'), the system updates the database based on the records and similarity categorization of the event, such as in step S407. Otherwise, when the system does not find out any possibility of collision ('no'), the system also updates the database based on the records, such as the records shown in Table one, such as in step S407. The kind of the driving event data includes the abnormal code corresponding to the present abnormal signal, the condition of collision, the time and location of the event, and the statuses of gas pedal, brake and steering wheel, and also the speed, acceleration and steering reflected by those data.

Table 1 exemplarily shows a sample of the experimental data in the database. The data may be adapted to the vehicles which have similar features such as the vehicular brand, model and type, or specified to certain kind of vehicle.

TABLE ONE

| Time/Date | trouble code | collision | speed | direction | Location (GPS) |
|---|---|---|---|---|---|
| 2014.1.2 14:22:22 | P0711 | yes | 60 | 150 | 25.0553088, 121.554115 |
| 2014.1.4 14:22:23 | P0126 | no | 55 | 151 | 25.0553477 121.554716 |
| 2014.1.8 14:22:27 | P0126 | no | 45 | 150 | 25.0551123, 121.555156 |
| 2014.1.9 14:22:28 | P0711 | yes | 32 | 150 | 25.0551156, 121.555168 |

Table one indicates two kinds of trouble codes, which does not limit the scope of invention. For example, the trouble code 'P0711' is defined to the abnormal signal relating to derailleur liquid temperature sensor circuit and performance; the trouble code 'P0126' is defined to the abnormal signal relating to coolant not reaching the temperature for stable operation.

It is also noted that the system can determine the corresponding conditions for a specific event by checking the trouble code recorded in the historical data shown in Table one. Accordingly, the system can find out the reasons of a great change of the abnormal vehicle.

In fact, the abnormal signal is generated before the abnormal vehicle suffers the abnormal situation. The driver of the abnormal vehicle reacts to the great change that already occurs. The historical data may record an average reaction time for every abnormal event. The database records the conditions as categorizing the reactions, e.g. braking, behaved by the drivers when they face different abnormal conditions. The Table two shows a sample of levels of braking and the corresponding ranges of speeds.

TABLE TWO

| levels | ranges |
|---|---|
| fast brake (light) | speed per hour <40 km/h; deceleration >5 km/h/s |
| fast brake (middle) | 70 km/h > speed per hour >40 km/h; deceleration >8 km/h/s |
| fast brake (heavy) | speed per hour >70 km/h; deceleration >10 km/h/s |
| emergency brake | deceleration >12 km/h/s |

In view of the above sample, the system can find out the similar condition when the vehicle meets abnormal event. Further, the database allows the system to predict the future traveling route of the abnormal vehicle, and the reaction time of the driver.

Figure 5:
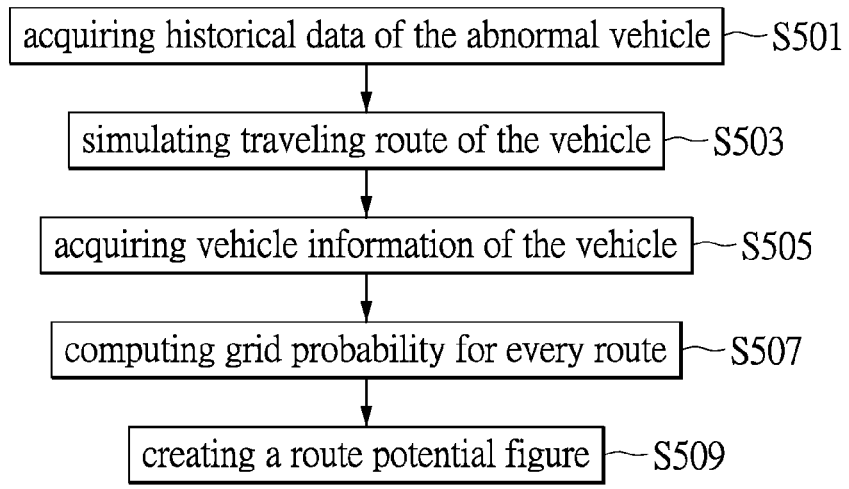
FIG. 5 shows a flow chart describing creating the route potential pattern for the abnormal vehicle in the method according to one embodiment of the present invention.

Further, the signals acquired by the system include driving event information corresponding to the abnormal signal besides the related vehicle information. The system categorizes the event based on the similarity, and acquires the similar historical data as comparing with the records in the database. The system accordingly predicts one or more traveling routes with respect to the abnormal signal. Reference is next made to FIG. 5 depicting a route potential pattern created according to the multiple predicted traveling routes. Base on this route potential pattern, the system then computes collision risk values for the multiple recommended routes for the nearby vehicles, e.g. the first vehicle, since the multiple routes have probability of entering the range of the route potential pattern.

The route potential pattern is created by searching the similar records in the database and obtaining the probabilities of the multiple predicted routes. In view of the route potential pattern, the system can compute probability of the nearby vehicle entering the route potential pattern of the abnormal vehicle according to the nearby vehicle's vehicle information such as the speed, acceleration, and the direction. The probability is a reference to calculate the collision risk.

FIG. 5 shows a flow chart depicting the method to create the route potential pattern for the abnormal vehicle according to one embodiment of the invention.

The avoidance system can be installed in the aforementioned first vehicle and the second vehicle that near the abnormal vehicle. The system performs the process to create the route potential pattern. In the beginning, such as in step S501, the avoidance system installed in the nearby vehicle receives the abnormal signal. The system searches the database for acquiring the historical data with respect to the abnormal vehicle, such as in step S503. The historical data allows the system to simulate the traveling route for the abnormal vehicle. There may have multiple predicted traveling routes. In next step S505, the system acquires vehicle information and retrieves the operating statuses of instant gas pedal, brake and/or steering wheel of the abnormal vehicle. The system therefore gains the information of vehicular speed, acceleration, and steering direction.

Figure 6:
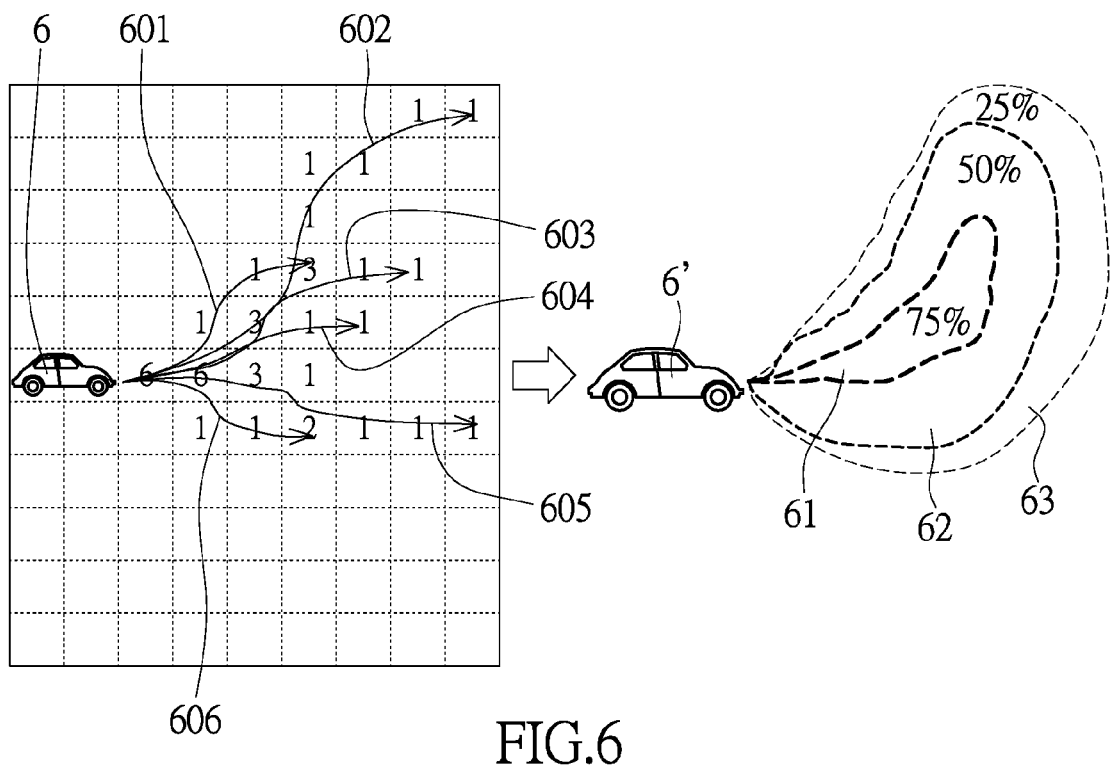
FIG. 6 shows a schematic diagram of creating the route potential pattern in the method in one embodiment of the present invention.

According to one of the embodiments of the present invention, a grid probability mechanism is introduced to compute the probabilities for the multiple predicted traveling routes of the abnormal vehicle, such as in step S507. Reference is made to FIG. 6 depicting a grid map. The grid probability for every predicted traveling route of the abnormal vehicle is drawn in the grid map. A route potential pattern is therefore created for indicating the probability of entering every grid in the grid map, such as in step S509.

In FIG. 6, a route potential pattern applicable to the method for collision avoidance for vehicle is schematically shown.

In the schematic diagram, the left side shows a matrix having grids which forms a grid map for an abnormal vehicle 6. When the avoidance system receives abnormal signal generated by the abnormal vehicle, the system acquires the similar data from the database. The traveling routes are simulated based on the historical data retrieved from the database. In an exemplary example, the system acquires driving event information corresponding to the abnormal signal by searching the similar records in the database. The driving event information includes one or more parameters selected from the abnormal code with respect to the present abnormal signal, the condition of collision, the event time, the vehicle location, the vehicle speed, the vehicle acceleration, the vehicle direction, and climate. The combination of the factors can be referred to find out the similar cases.

Next, the avoidance system draws the at least one predicted traveling routes 601, 602, 603, 604, 605, and 606 overlapped over the grid map. From a starting point of every predicted traveling route for the abnormal vehicle 6, the number in each grid is counted when the one or more predicted routes 601, 602, 603, 604, 605, and/or 606 are drawn on the grid map. Every grid of the grid map occupies a certain area. A probability value for every grid is accumulated, e.g. plus one, as one predicted route passes over. A final probability value for every grid can be calculated by counting the number of the routes passing every grid. The final probability values are such as the numbers '5', '5', '3', '2', '1' and so on shown in the diagram. The larger the number of the grid is, the higher the probability of the traveling route passing over the grid is.

The right side of the diagram depicts a route potential pattern based on the grid probability of the abnormal vehicle 6' over the grid map. The route potential pattern is used to describe the grid probability for the abnormal vehicle 6. The grid map schematically shows the region near the abnormal vehicle 6 has higher probability, and the region away from the abnormal vehicle 6 has lower probability. For creating the route potential pattern shown at the right side of the figure, the system computes the percentage of the every grid according to every grid's probability and classifies the grids based on the percentage for every grid into several regions. The grids within the same region have roughly the same probability. For example, the route potential pattern includes three regions which include a first potential route probability 61 with probability 75%, a second potential route probability 62 with probability 50%, and a third potential route probability 63 with probability 25%. The first potential route probability 61 is used to describe the probabilities of the abnormal vehicle 6' entering the regions. Based on the route potential pattern, the probability of the abnormal vehicle colliding with the nearby vehicle can be estimated. To calculate the probability of every region (61, 62, 63) for creating the route potential pattern, the equation "probability=(number of passing routes)/(number of the routes) is applied. The regions with various probabilities are classified using a proportion calculation, and the route potential pattern is accordingly created.

FIG. 7 shows a schematic diagram depicting the method for collision avoidance for vehicle in accordance with the present invention.

In the exemplary example, a fourth vehicle 704 is shown. The fourth vehicle 704 represents an abnormal vehicle which generates an abnormal signal to this nearby vehicles such as the shown first vehicle 701, the second vehicle 702, and/or the third vehicle 703. In the meantime, the avoidance systems in those nearby vehicles first acquire historical data corresponding to the abnormal signal. The route potential pattern is then created, e.g. through the method described in FIG. 6 as incorporating multiple predicted traveling routes, and is used to predict the multiple potential routes for the fourth vehicle 704. After estimating the probabilities for multiple potential routes, the route potential pattern including regions with a first potential route probability 71, a second potential route probability 72, and a third potential route probability 73 can be created. The potential route 705 with highest probability is most likely the traveling route for the fourth vehicle 704 in a future period of time. After that, the potential route 705 acts as a basis to assess if the abnormal vehicle collides with the nearby vehicle.

The first vehicle 701 represents the nearby vehicle of the fourth vehicle 704. An arrow line indicates driving direction of the first vehicle 701 is a straight direction 706. The route potential pattern is drawn after predicting the traveling routes for the fourth vehicle 704. The system assesses there is a possibility of the fourth vehicle 704 colliding with the first vehicle 701 in a future period of time since there is an intersection point, e.g. the collision point 707, between the straight direction 706 of the first vehicle 701 and the potential route 705 of the abnormal fourth vehicle 704.

The avoidance system installed in the nearby vehicle, e.g. the first vehicle 701, computes the available routes with various proceeding angles θ according to the vehicle information of the nearby vehicle near the abnormal vehicle, e.g. the fourth vehicle 704. For example, the shown straight route 706, which is one of the available routes for the first vehicle 701, is estimated according to the vehicular speed, acceleration, and direction. The avoidance system then determines whether or not the nearby vehicle, e.g. the first vehicle 701, will enter the range of the route potential pattern of the fourth vehicle 704. When the system determines it is possible that the fourth vehicle 701 collides with the fourth vehicle 704, one of the recommended routes will be suggested immediately. In an exemplary example, the first vehicle 701 may travel along one available route with an upward angle θ. In practice, the system acquires the multiple available routes with various traveling angles according to the vehicle information of the first vehicle 701, and then computes the collision risk values corresponding to the multiple recommended routes since they have various relationships with the route potential feature of the abnormal vehicle.

Furthermore, the avoidance system also receives other nearby vehicles' vehicle information simultaneously when it renders the recommended route for the nearby vehicle. In addition to receiving the abnormal signal generated by the abnormal vehicle, e.g. the fourth vehicle 704, the avoidance system further receives other vehicle information from the other vehicles prior to or after the fourth vehicle 704. In the present example, the avoidance system obtains the traveling route of the second vehicle 702 as acquiring the vehicle information of the second vehicle 702. The system re-computes the collision risk values with respect to the recommended routes for re-arranging the available routes for avoiding the abnormal vehicle when the system obtains traveling routes from the first vehicle 701, the second vehicle 702, and the fourth vehicle 704, e.g. the abnormal vehicle, in the period of time.

After that, the system can provide one or more re-computed recommended routes for the vehicles from colliding with each other because of the abnormal event while the system obtains the vehicle information such as the speed, acceleration, and steering direction from the second vehicle 702 and the third vehicle 703.

In an exemplary example, the avoidance system computes a first distance $d_1$ between the first vehicle 701, possibly with a traveling angle θ, and the second vehicle 702 on the same lane according the vehicle information of the following second vehicle 702. The avoidance system also computes a second distance $d_2$ between the preceding third vehicle 703 and the first vehicle 701, possibly with an angle θ, at the same lane as receiving the vehicle information of the third vehicle 703. When the system acquires the above-mentioned information, the system considers the possible routes for the first vehicle 701 after the first vehicle 701 has avoided the abnormal vehicle. In the meantime, the system computes the collision risk values for the recommended routes for the first vehicle 701 as considering the distances $d_1$, $d_2$ from the second vehicle 702 and the third vehicle 703, and the probability of entering the route potential pattern of the abnormal vehicle. Therefore, the system is able to provide the safer recommended route as arranging the routes for avoiding the abnormal vehicle.

To provide the recommended route(s), the system computes the collision risk value for every recommended route. The system may determine if there is a buffer time to react the abnormal event. If there is enough time to react the event, the system continuously computes the safer route or the route with lower risk which is regarded as the recommended route. The flow chart shown in FIG. 8 describes a whole process in the method for collision avoidance for vehicle in one embodiment of the present invention.

In the method operating among the avoidance systems installed in the vehicles which are communicated with each other, in a beginning step S801, one of the avoidance systems receives an abnormal signal from the vehicle itself. In the meantime, the avoidance system receives the vehicle information from the nearby vehicles. The system continuously receives the information including the statuses of gas pedal, brake, and the steering wheel from the abnormal vehicle. In step S803, the system acquires historical data with respect to the abnormal signal as comparing with a database which is established by collecting the historical data. The system acquires the similar case as searching the similar data in the database according to one or more parameters selected from the factors including the abnormal code, collision condition, event time, vehicle location, vehicle speed, vehicle acceleration, vehicle direction, and climate. The system then simulates the potential route for a specific vehicle. In step S805, the system also refers to the route potential pattern which is created according to the grid probability by accumulating the number of the potential routes passing through every grid described in the embodiment shown in FIG. 5.

Next, the system determines the traveling route of the nearby vehicle, e.g. the first vehicle 701, according to its vehicle information, such as in step S807. The system then determines if the predicted traveling route of the nearby vehicle will enter the range of the route potential pattern of the abnormal vehicle. Accordingly, the system can predict if it is possible to meet the collision event in a future period of time, and assess if the following vehicle will overtake and collide the vehicle having this avoidance system.

If the system determines there is no risk of collision between the nearby vehicle and the abnormal vehicle ('no'), such as in step S809, the system continuously detects the next abnormal signal. The process is repeated when the system detects the next abnormal signal. If the system determines there is a risk of collision ('yes'), the process goes to step S811. In the step, the system determines a time for the abnormal vehicle suffering the abnormal change according to the historical data (81) in the database. The abnormal change is usually a great change with safety concerns. It is noted that the generation of abnormal signal is before the abnormal event. The historical data (81) allows the system to predict a buffer time from a normal state to the great change of the abnormal vehicle when the abnormal signal is generated. The buffer time allows the nearby vehicle to react the abnormal event by adopting an avoiding route. The system uses the buffer time to provide the recommended route with relatively low collision risk value for the nearby vehicle as computing the collision risk value for every recommended route.

The system can acquire the similar event from the historical data as comparing with the database exemplarily using the same trouble code in the vehicle information. Based on the historical data, the system acquires a great change time (t1) from the normal state to the beginning of great change. The system therefore calculates a traveling distance ($D_{t1}$) from the normal state to the abnormal state. From the vehicle information of the nearby vehicle, the system acquires a distance ($D_{potential}$) of the traveling route estimated to enter the route potential pattern based on the vehicle information of the nearby vehicle. The potential distance $D_{potential}$ can be calculated according to the vehicular speed and the time information. As in step S813, the system then compares the two distances ($D_{t1}$, $D_{potential}$), and selects the potential distance ($D_{potential}$) or the traveling distance ($D_{t1}$) from the normal state to the great change, whichever is smaller.

Next, the system compares the potential distance ($D_{potential}$) or the traveling distance ($D_{t1}$), whichever is smaller, with a system-defined safety distance. In step S815, the system determines if the smaller distance is smaller than the safety distance. It is noted that the safety distance is configured by referring to the instant vehicular speed. One of the objectives to set the safety distance is to allow the system having adequate distance/time to compute the recommended route.

In this period of time, the system in the abnormal vehicle may provide various recommended routes through the computation for the nearby vehicle(s). The system also computes various recommended routes for the nearby vehicle(s) and also the collision risk value for every recommended route, such as in step S817. When the potential distance ($D_{potential}$) or the traveling distance ($D_{t1}$) from the normal state to the great change, whichever is smaller, is smaller than the safety distance, the system uses the instant route with currently-lowest collision risk value to be the best recommended route for the nearby vehicle. The system will ask the nearby vehicle to refer to the recommended route for avoidance, such as in step S819.

In another condition, when the potential distance ($D_{potential}$) or the traveling distance ($D_{t1}$) from the normal state to the great change, whichever is smaller, is still larger than or equal to the safety distance, it shows there is enough time to find out safer avoiding route for the nearby vehicle rather than regarding the instant route with the relatively-lower collision risk value as the best recommended route. The system therefore periodically re-computes the collision risk values for the multiple recommended routes in every time interval. The steps are repeatedly processed to estimate the collision risk values for the routes related to the route potential pattern. The system compares the collision risk value with a system-defined risk threshold. The system determines if the collision risk value for every recommended route is lower than the risk threshold within this buffer time, such as in step S821. If the collision risk value is not lower than the risk threshold ('no'), the process goes to step S811 for continuously comparing the potential distance ($D_{potential}$) or the traveling distance ($D_{t1}$) from the normal state to the great change, whichever is smaller, with the safety distance. The comparison is used to gain the route with the lowest collision risk value until finding out the route's risk value lower than the risk threshold. If the system gains the route with the collision risk value lower than the risk threshold ('yes'), such as in step S823, the route with the risk value lower than the risk threshold, or the route with the lowest collision risk value will be selected to be the best recommended route.

When the system re-determines if any route with the collision risk value is lower than the risk threshold, the process may be terminated if the abnormal vehicle starts the great change. In the meantime, the nearby vehicle may regard the instant recommended route as the best avoiding route.

Figure 8:
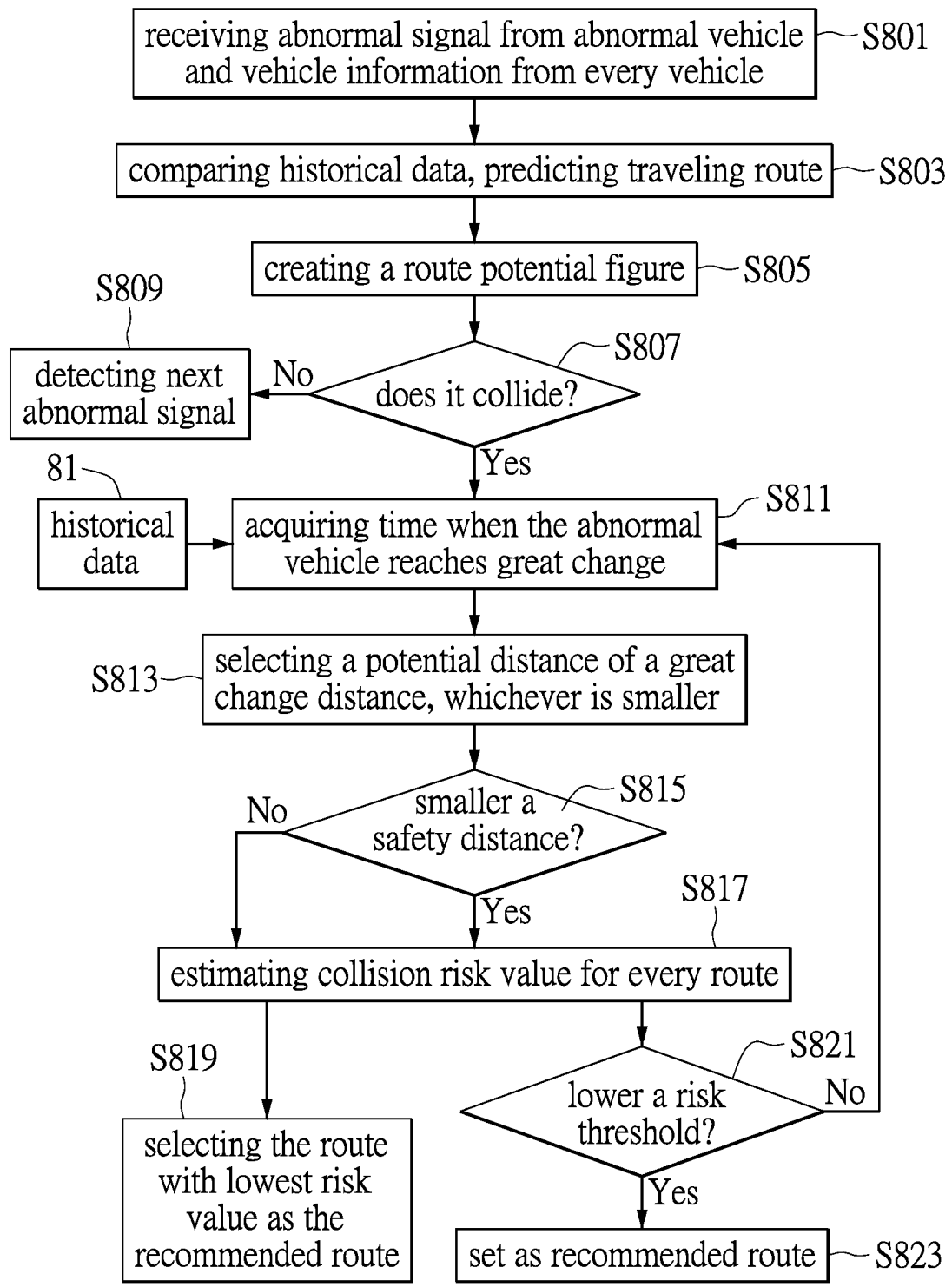
FIG. 8 shows an overall flow chart of the method according to the embodiment in accordance with the present invention.
Figure 9:
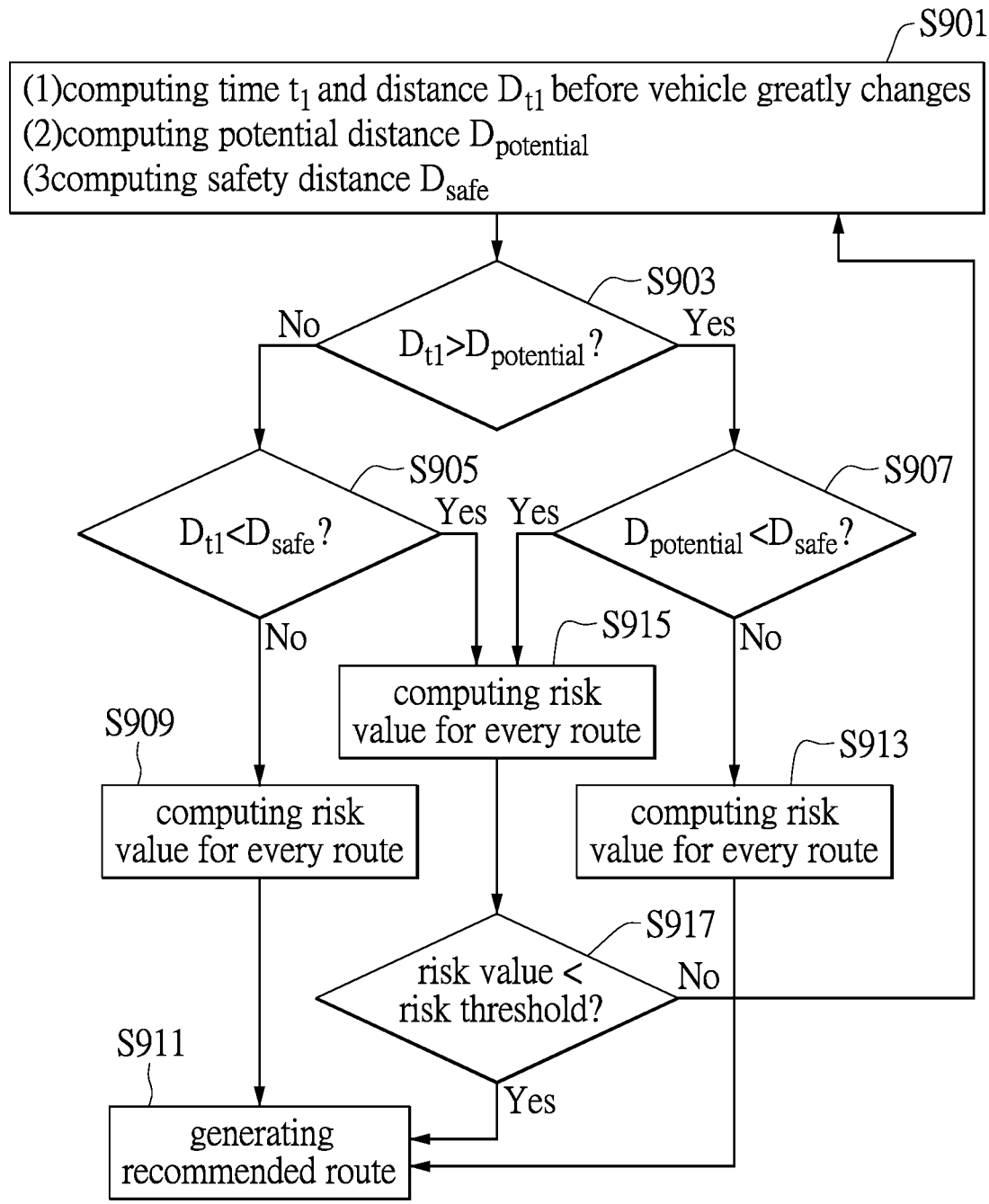
FIG. 9 shows a flow chart for determining the recommended route in the method in one embodiment of the present invention.

In the flow chart shown in FIG. 8, the system compares the potential distance ($D_{potential}$) or the traveling distance ($D_{t1}$) from the normal state to the great change, whichever is smaller, with the safety distance for providing the driver to have a better avoiding route. Reference is made to FIG. 9 depicting the process for rendering the recommended route in a routing plan.

In the process of the method, step S901 shows the parameters acquired by the system. The parameters include:

(1) A great change distance $D_{t1}$. After the system receives the abnormal signal generated by the abnormal vehicle, the system estimates a time t1 from the normal state to the great change according to the historical data. Then the system computes the great change distance $D_{t1}$ based on the time t1 and the instant speed of the abnormal vehicle.

(2) A potential distance $D_{potential}$. When the route potential pattern of the abnormal vehicle is created, the system computes the potential distance $D_{potential}$ from the position of the nearby vehicle to the range of the route potential pattern along a traveling route of the nearby vehicle.

(3) A safety distance $D_{safe}$. The system estimates the safety distance $D_{safe}$ based on the vehicle information, e.g. the speed, of the two vehicles.

Next, such as in step S903, the system compares the great change distance $D_{t1}$ from normal state to great change of the abnormal vehicle and the potential distance $D_{potential}$. The system determines if the great change distance $D_{t1}$ is larger than the potential distance $D_{potential}$. The system adopts the potential distance ($D_{potential}$) as the nearby vehicle entering the route potential pattern of the abnormal vehicle or the traveling distance ($D_{t1}$) from the normal state to the great change, whichever is smaller.

If the great change distance $D_{t1}$ is not larger than the potential distance $D_{potential}$ ('no'), it shows the potential distance $D_{potential}$ is larger than the great change distance $D_{t1}$, and the system adopts the great change distance $D_{t1}$. In step S905, the system compares the great change distance $D_{t1}$ with a safety distance $D_{safe}$ for determining if the great change distance $D_{t1}$ is smaller than the safety distance $D_{safe}$. If the great change distance $D_{t1}$ is larger than the safety distance $D_{safe}$ ('no'), it shows there is no enough time to re-compute the collision risk value, and adopts the recommended route with the currently-lowest collision risk value. In step S909, the system computes the collision risk value for every recommended route. In step S911, the system regards the route with the lowest risk value as the best recommended route. Otherwise, if the great change distance $D_{t1}$ is smaller than the safety distance $D_{safe}$ ('yes'), it shows there is enough safety distance $D_{safe}$ and related time to find out another route with the risk value lower than the risk threshold. In step S915, the system computes the collision risk value for every recommended route, and compares the collision risk value with the risk threshold, such as in step S917. The system determines if there is any route's collision risk value including the currently-lowest risk value smaller than the risk threshold. In the comparison, the route with the collision risk value smaller than the risk threshold is regarded as the best recommended route, such as in step S911. It is noted that any route corresponding to the collision risk value lower than the risk threshold can be the recommended route; further the route with the lowest collision risk value is preferably the best recommended route.

As comparing the great change distance $D_{t1}$ with the potential distance $D_{potential}$ in step S903, if the potential distance $D_{potential}$ is the smaller one ('yes'), the system then compares the potential distance $D_{potential}$ with the safety distance $D_{safe}$ for determining if the potential distance $D_{potential}$ is smaller than the safety distance $D_{safe}$, such as in step S907. If the great change distance $D_{t1}$ is smaller ('no'), it shows the potential distance $D_{potential}$ is larger than the safety distance $D_{safe}$. It reveals that the distance between the traveling route of the nearby vehicle and the range of route potential pattern of the abnormal vehicle is not within the safety distance $D_{safe}$; the system cannot gain a better recommended route by re-computation of the collision risk values. Therefore, the instant recommended route is adopted by the system as shown in step S913. Then the system regards the recommended route with the lowest collision risk value as the best recommended route, such as step S911. According to comparison in step S907, if the potential distance $D_{potential}$ is smaller than the safety distance $D_{safe}$ ('yes'), the process goes to step S915 for computing the collision risk value for every route. The collision risk values for the recommended routes are compared with the risk threshold, such as in step S917. If the system finds out any route with the collision risk value smaller than the risk threshold, the corresponding route is regarded as the best recommended route, such as in step S911.

In the foregoing process, in the step S917 for comparing the collision risk value with the risk threshold, the system may still find out the better recommended route when the great change distance $D_{t1}$ or the potential distance $D_{potential}$ is smaller than the safety distance $D_{safe}$ since there is time to re-compute the collision risk value for every instant route. When no collision risk value lower than the risk threshold is found, the process may go to step S901, preferably in a time interval, for re-computing the great change distance $D_{t1}$, the potential distance $D_{potential}$, and the safety distance $D_{safe}$. The system under the same situation continuously re-computes the collision risk values for the nearby vehicle, e.g. the first vehicle 701 of FIG. 7, and the abnormal vehicle, e.g. the fourth vehicle 704 of FIG. 7. In every time period, an instant best recommended route is existed. The computation can be repeated in condition for having enough time with adequate safety distance until any collision risk value lower than the risk threshold. It is noted that the lowest collision risk value may already there in the computation. In the meantime, the route corresponding to the lowest collision risk value is set as the best recommended route.

In another case, when the system tries to find out the best recommended route, the process may be terminated if the system determines the abnormal vehicle is at the great change. The route with the currently-lowest collision risk value can be set as the best recommended route.

The risk threshold is provided for the system to make the decision when in the process determining the best recommended route in every time interval. The system can find out the best recommended route from at least one available route which has its own collision risk value. Alternatively, the avoidance system computes the collision risk values from the available routes, and regards the route with the lowest collision risk value as the best recommended route.

FIG. 10 shows a block diagram depicting the system for implementing the above process in one embodiment of the present invention.

The function modules in the avoidance system can be implemented by software, firmware, or hardware. The system essentially includes a signal receiving unit 1001, a vehicle information acquiring unit 1002, an abnormal signal acquiring unit 1003, a potential figure creating unit 1004, a database 1005, and a route risk estimating unit 1006, a route determination unit 1007, and an output unit 1008 for outputting the recommended route.

The signal receiving unit 1001 can be used to receive signals from the nearby vehicle(s), especially the signals containing the trouble code. The signals may be retrieved from the normal vehicle 101 and the abnormal vehicle 102. The means for transmitting the signals transmitted from the normal vehicle 101 is such as a wireless communication network, e.g. WiFi™ Bluetooth™, mobile communication network, or Beacon, that allows the system directly to receive information from the nearby vehicle(s). A cloud system may be in another aspect of the invention for retrieving the vehicle information from the various vehicles' vehicle information in first step, and serving the vehicle which requests the information. The method for delivering the information may be the mobile communication network. The system installed in the vehicle may retrieve the vehicle information via the interface in compliance with the standard OBD or OBDII.

The vehicle information acquiring unit 1002 is used to receive the data from the signal receiving unit 1001. The data is such as the operating data of the gas pedal, brake, and/or steering wheel of the nearby vehicle. The information allows the system to predict the traveling route.

The abnormal signal acquiring unit 1003 can be used to extract the abnormal signal from the vehicle information. The signal is such as the trouble code. The vehicle information related to the trouble code is also retrieved. As comparing with the historical data in the database 1005, the similar content can be obtained. The content includes the historical data, statuses of pedal and steering wheel with respect to the present trouble code. After an analysis performed by the system, the future traveling route of the abnormal vehicle can be predicted. The potential figure creating unit 1004 is used to create a route potential pattern having multiple potential routes for the abnormal vehicle as collecting the historical data from the abnormal signal acquiring unit 1003. The route risk estimating unit 1006 then estimates the collision risk value for every route based on the nearby vehicle's speed and traveling direction.

The software or hardware-implemented route determination unit 1007 firstly retrieves the distance relationship among the vehicles. For example, the route determination unit 1007 can obtain the time information 1013 from the vehicles, including the time (t1) from a normal state to the abnormal state of the abnormal vehicle, a time a ($t_{potential}$) as the nearby vehicle entering the route potential pattern of the abnormal vehicle, and a safe time ($t_{safe}$) between the vehicles. Therefore a safety distance between the vehicles can also be calculated. The route determination unit 1007 retrieves the vehicle information from the vehicle information acquiring unit 1002, and accordingly estimates the distance between the nearby and the abnormal vehicles. The safety distance 1011 is used to check if the distance is enough for the system to find out another better recommended route; or to estimate the time of the nearby vehicle entering the range of route potential pattern of the abnormal vehicle. The risk threshold 1012 can be recorded in the database 1005, and used to be the reference to determine if the system gets the route with the lowest collision risk value which may be set as the best recommended route. The output unit 1008 finally outputs the recommended route for the driver of the nearby/normal vehicle, or for the abnormal vehicle.

Figure 11A:
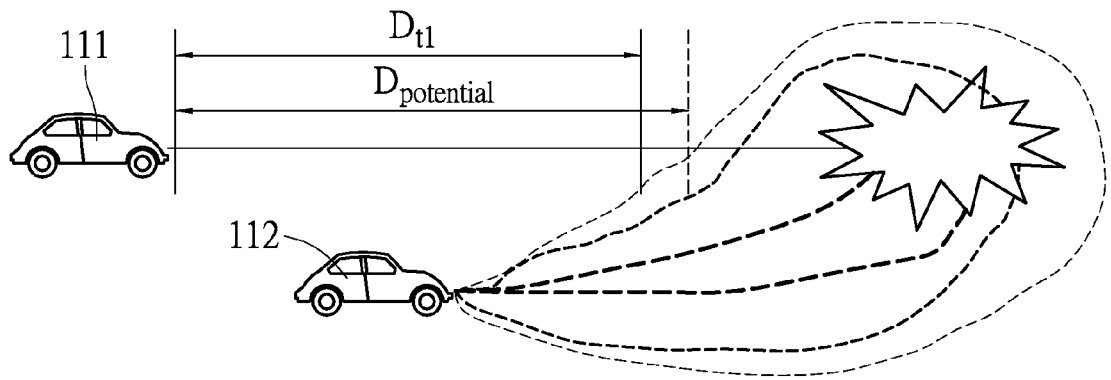
FIG. 11A and FIG. 11B schematically show distance relationship between the abnormal vehicle and the nearby vehicle in one embodiment of the present invention.
Figure 11B:
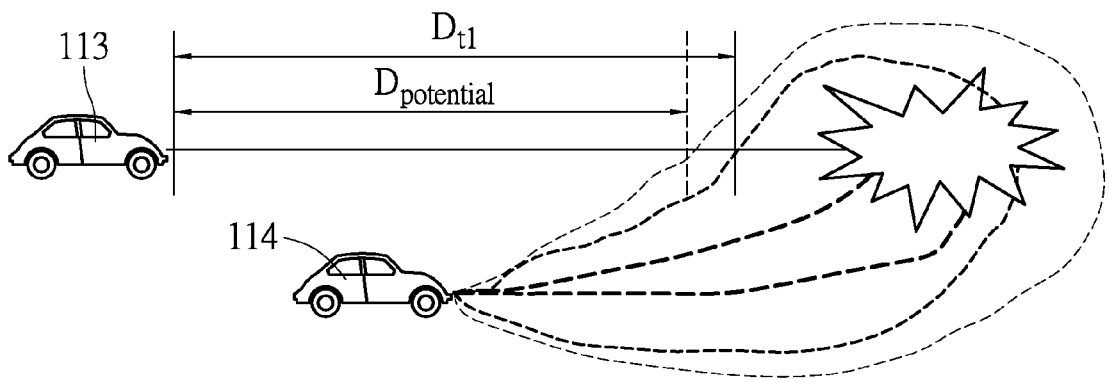

FIGS. 11A and 11B depict the distance relationship between the abnormal vehicle and the nearby vehicle, and as the additional description for the above embodiments, especially for exemplarily describing the selection between the great change distance ($D_{t1}$) and the potential distance ($D_{potential}$).

The time from a normal state to the abnormal state for the abnormal vehicles 112, 114 is derived to a great change distance ($D_{t1}$). A potential distance ($D_{potential}$) is derived by estimating the distance as the nearby vehicles 111, 113 entering the ranges of the route potential patterns for the abnormal vehicles 112, 114. The relationship between the great change distance ($D_{t1}$) and the potential distance ($D_{potential}$) is as basis to determine if the distance is outside the safety distance.

In FIG. 11A, it shows the great change distance ($D_{t1}$) is smaller than the potential distance ($D_{potential}$). The system may regard the distance for the abnormal vehicle 112 from normal state to the great change as safety concerns. However, if the great change distance ($D_{t1}$) is larger than the safety distance, the system requires an emergent route for avoiding the abnormal vehicle. Otherwise, the system may have enough plenty of time to re-compute the collision risk value for every route, and simultaneously determine the better recommended route.

FIG. 11B schematically shows the potential distance ($D_{potential}$) from the nearby vehicle 113 to the abnormal vehicle 114 is smaller than the great change distance ($D_{t1}$) of the abnormal vehicle 114. Thus the system regards the great change distance ($D_{t1}$) as in consideration of safety. The great change distance ($D_{t1}$) is used to compare with the safety distance. When the potential distance ($D_{potential}$) is larger than or equal to the safety distance, the system may re-compute the collision risk value for every route since it has time to find out further better recommended route.

Figure 12A:
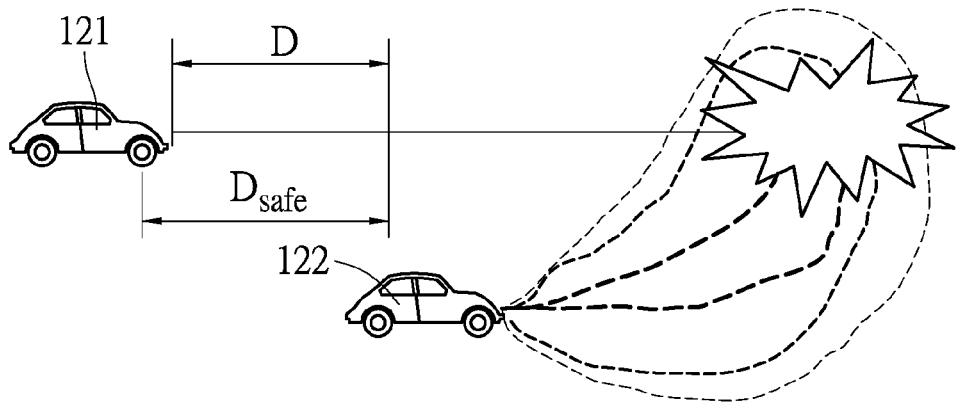
FIG. 12A and FIG. 12B schematically show the relationship of the distance and safety distance between the abnormal vehicle and the nearby vehicle.
Figure 12B:
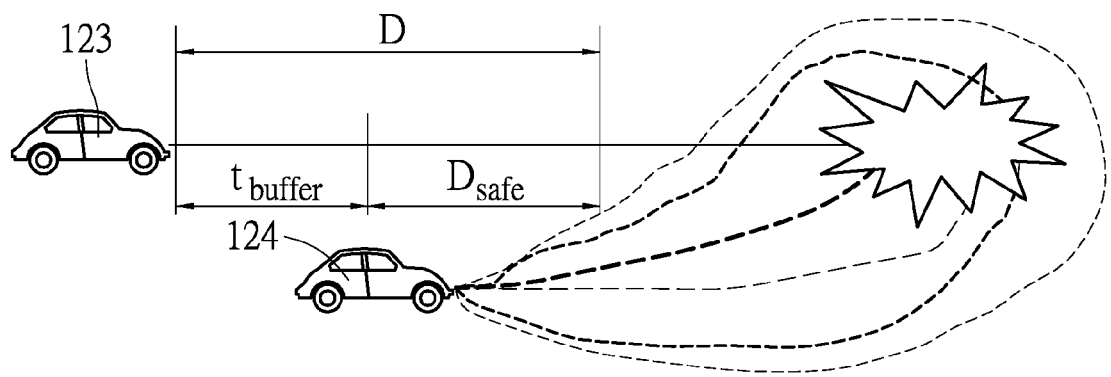

Both FIG. 12A and FIG. 12B schematically describe the relationship between the abnormal vehicle and the nearby vehicle. The system is allowed to repeatedly find out the recommended route with lower risk. FIGS. 11A and 11B describe the system acquiring the great change distance ($D_{t1}$) or the potential distance ($D_{potential}$), whichever is smaller. The smaller one is compared with the safety distance for determining if there is time to re-compute the risk for finding out the better recommended route. The risk threshold is introduced to this comparison for acquiring the better recommended route.

FIG. 12A schematically shows a nearby vehicle 121 approaching the abnormal vehicle 122 generating the abnormal signal. The avoidance system, preferably installed in the nearby vehicle 121, receives this abnormal signal from the abnormal vehicle 122. As comparing with the historical data, the system acquires multiple traveling routes for the abnormal vehicle 122. As the method shown in FIG. 6 that creates a route potential pattern for determining whether or not the nearby vehicle 121 will collide with the abnormal vehicle 122 in a short time. Based on the historical data, the avoidance system can firstly acquire the time (t1) for the abnormal vehicle 122 for a normal state to the abnormal state. Then a great change distance ($D_{t1}$) can be estimated. The system further estimates a potential time a ($t_{potential}$) as the nearby vehicle 121 entering the potential pattern of the abnormal vehicle 122. The system can acquire a safe time ($t_{safe}$) and a safety distance ($D_{safe}$) between the two vehicles.

In the meantime, the avoidance system acquires one or more recommended routes combination for the nearby vehicle 121 to avoid the abnormal vehicle 122 according to the vehicles' information relating to the speed, acceleration, and/or steering direction. The system then estimates the collision risk value with respect to every recommended route. The system simultaneously acquires the great change distance ($D_{t1}$) or the potential distance ($D_{potential}$), whichever is smaller, and set as the distance D. FIG. 12A schematically shows the safety distance ($D_{safe}$) is slightly larger than the distance D. It shows, for the nearby vehicle 121, there is no enough time to find out other better recommended route. The system instantly provides the route with currently-lowest collision risk value for the nearby vehicle as the best recommended route.

FIG. 12B schematically shows another condition when the system acquires the great change distance ($D_{t1}$) or the potential distance ($D_{potential}$), whichever is smaller, between the nearby vehicle 123 and the abnormal vehicle 124. It shows a distance D representing the small one. The distance D is larger than the safety distance $D_{safe}$. Under this situation, the nearby vehicle 123 still has a buffer time $t_{buffer}$ to react the possible collision, and the system can re-compute the collision risk value for every route periodically. Therefore, the system is able to provide the better recommended route with the lower collision risk value.

Thus, the above embodiments of the present invention show the technology which is used to predict the traveling routes under abnormal condition based on the historical data. In the method, a route potential pattern is introduced to provide the information of the distance relationship between the nearby vehicle and the abnormal vehicle. The vehicle information of nearby vehicle is also incorporated in the system as the reference for providing the recommended route for avoiding the abnormal vehicle. Further, the system estimates the collision risk value for every recommended route according to the dynamics and time information of the abnormal vehicle. The system allows the driver of vehicle to react the possible accident in advance by providing the effective avoiding route.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for collision avoidance for vehicle, comprising:
    an avoidance system installed in a first vehicle receiving an abnormal signal from an abnormal vehicle;
    the avoidance system predicting at least one predicted traveling route for the abnormal vehicle within a period of time according to historical data with respect to the abnormal signal and vehicle information of the abnormal vehicle;
    the avoidance system providing at least one recommended route for the first vehicle within the period of time based on the at least one predicted traveling route;
    the avoidance system computing a collision risk value for every recommended route for the first vehicle; and
    the avoidance system deciding a best recommended route for the first vehicle to avoid the abnormal vehicle according to the collision risk value corresponding to every recommended route.

2. The method as recited in claim 1, wherein the step of recommending the at least one recommended route for the first vehicle further comprises:
    the avoidance system acquiring vehicle information of the first vehicle, the vehicle information including at least one of operating statuses of gas pedal, brake, and steering wheel; and
    the avoidance system deciding the recommended route according to the predicted traveling route for the abnormal vehicle and the vehicle information of the first vehicle.

3. The method as recited in claim 1, wherein, the avoidance system configures the route with the lowest collision risk value as the best recommended route.

4. The method as recited in claim 1, wherein the historical data is recorded in a database, the method to establish the database comprises:
the avoidance system receiving driving event information corresponding to the abnormal signal generated by the abnormal vehicle when the avoidance system receives the abnormal signal; and the avoidance system categorizing the driving event information based on similarity, wherein the driving event information includes at least one of an abnormal code, a collision, an event time, a vehicle location, a vehicle speed, a vehicle acceleration, a vehicle direction, and climate corresponding to the abnormal signal.

5. The method as recited in claim 4, wherein the step of computing the collision risk value for every recommended route for the first vehicle is performed based on whether or not the recommended route for the first vehicle enters a route potential pattern of the abnormal vehicle; wherein the method for creating the route potential pattern comprises:
the avoidance system drawing the at least one predicted traveling route for the abnormal vehicle on a grid map; and accumulating number of times of the at least one predicted traveling route passing through each grid of the grid map, and the route potential pattern is produced based on a proportion calculation.

6. The method as recited in claim 5, further comprising:
providing the best recommended route for the first vehicle if the avoidance system determines that a distance between the first vehicle and the abnormal vehicle is smaller than a safety distance; and
if the avoidance system determines the distance between the first vehicle and the abnormal vehicle is larger than the safety distance, the avoidance system repeatedly computing the collision risk value for one or more recommended routes for the first vehicle in every time interval until the collision risk value is found to be lower than then a risk threshold, and instantly the corresponding route configured to be the best recommended route for the first vehicle.

7. The method as recited in claim 5, further comprising:
providing the best recommended route for the first vehicle if the avoidance system determines that a distance between the first vehicle and the abnormal vehicle is smaller than a safety distance; and
if the avoidance system determines the distance between the first vehicle and the abnormal vehicle is larger than the safety distance, the avoidance system repeatedly computing the collision risk value for one or more recommended routes for the first vehicle in every time interval and an instant best recommended route until the abnormal vehicle reaches a great change; the instant best recommended route configured to be the best recommended route for the first vehicle.

8. The method as recited in claim 5, further comprising:
the avoidance system acquiring driving event information for the database based on similarity in response to the abnormal signal generated by the abnormal vehicle, acquiring a great change time from normal to abnormal of the abnormal vehicle, and computing a great change distance from normal to abnormal of the abnormal vehicle according to the great change time;
the avoidance system acquiring a traveling route of the first vehicle according to vehicle information of the first vehicle, and computing a potential distance when the first vehicle is estimated to enter the route potential pattern of the abnormal vehicle;
the avoidance system comparing the great change distance or the potential distance, whichever is smaller, with a safety distance;
the avoidance system providing the best recommended route for the first vehicle if the avoidance system determines the great change distance or the potential distance, whichever is smaller, is smaller than the safety distance; and
if the avoidance system determines the great change distance or the potential distance, whichever is smaller, is larger than the safety distance, the avoidance system periodically computing the collision risk value for every recommended route for the first vehicle to avoid the abnormal vehicle in every time interval until the collision risk value is found to be lower than a risk threshold, and the corresponding route with instant lowest collision risk value configured to be the best recommended route.

9. The method as recited in claim 4, wherein the avoidance system does not record the vehicle information corresponding to the abnormal signal when the avoidance system detects that the abnormal vehicle slows down after receiving the abnormal system generated by the abnormal vehicle.

10. The method as recited in claim 4, wherein, after receiving the abnormal signal generated by the abnormal vehicle, the avoidance system further receives vehicle information from a second vehicle so as to acquire the second vehicle's traveling route within the period of time; and the avoidance system re-computes the collision risk value according to traveling routes of the first vehicle, the second vehicle and the abnormal vehicle for re-arranging the recommended route to avoid the abnormal vehicle.

11. A system for collision avoidance for vehicle, installed in a nearby vehicle near an abnormal vehicle, comprising:
a signal receiving unit, used to receive signals from a nearby vehicle, and signals from the abnormal vehicle;
a vehicle information acquiring unit, retrieving vehicle information from the signals obtained from the signal receiving unit;
an abnormal signal acquiring unit, retrieving the abnormal signal from every vehicle's vehicle information and obtaining historical data as comparing the abnormal signal with a database, for analyzing a predicted traveling rout of the abnormal vehicle;
a potential figure creating unit, forming a route potential pattern having multiple potential routes according to the historical data corresponding to the abnormal vehicle from the abnormal signal acquiring unit;
a route risk estimating unit, acquiring one or more recommended routes according to vehicle information of the nearby vehicle, and computing collision risk value for every recommended route;
a route determination unit, acquiring distance relationship between the vehicles, and providing the recommended route with the lowest collision risk value based on whether or not a distance between the nearby vehicle and the abnormal vehicle is smaller than a safety distance; and
an output unit, used to output the recommended route generated from the route determination unit to the nearby vehicle.

12. The system as recited in claim 11, wherein the avoidance system is installed in at least one vehicle, and a wireless communication network is provided among the vehicles for transmitting signals.

13. The system as recited in claim 11, wherein the route determination unit estimates distance relationship between the vehicles according to a time that the abnormal vehicle becomes from normal to abnormal status, a time that the nearby vehicle enters the route potential pattern of the abnormal vehicle, and a safe time between the abnormal vehicle and the nearby vehicle.

14. The system as recited in claim 13, wherein the route determination unit introduces a risk threshold to determine if the best recommended route with the lower collision risk value is obtained.

15. The system as recited in claim 11, wherein the information acquired by the vehicle information acquiring unit includes at least one piece of operating data of gas pedal, brake and steering wheel.

16. The system as recited in claim 11, wherein the abnormal signal acquired by the abnormal signal acquiring unit includes trouble code and its corresponding vehicle information.

* * * * *